(12) United States Patent
Cai et al.

(10) Patent No.: US 9,003,126 B2
(45) Date of Patent: Apr. 7, 2015

(54) APPARATUS, SYSTEM AND METHOD FOR ADAPTIVE CACHE REPLACEMENT IN A NON-VOLATILE MAIN MEMORY SYSTEM

(71) Applicants: Qiong Cai, Barcelona (ES); Nevin Hyuseinova, Barcelona (ES); Serkan Ozdemir, Barcelona (ES); Ferad Zyulkyarov, Barcelona (ES); Marios Nicolaides, Barcelona (ES); Blas Cuesta, Barcelona (ES)

(72) Inventors: Qiong Cai, Barcelona (ES); Nevin Hyuseinova, Barcelona (ES); Serkan Ozdemir, Barcelona (ES); Ferad Zyulkyarov, Barcelona (ES); Marios Nicolaides, Barcelona (ES); Blas Cuesta, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 13/626,464

(22) Filed: Sep. 25, 2012

(65) Prior Publication Data

US 2014/0089559 A1 Mar. 27, 2014

(51) Int. Cl.
*G06F 12/12* (2006.01)

(52) U.S. Cl.
CPC .................................... *G06F 12/126* (2013.01)

(58) Field of Classification Search
None
See application file for complete search history.

(56) References Cited

U.S. PATENT DOCUMENTS

| 6,523,092 | B1 | 2/2003 | Fanning | |
|---|---|---|---|---|
| 6,671,780 | B1 | 12/2003 | Lu et al. | |
| 6,823,426 | B2 | 11/2004 | Goldschmidt et al. | |
| 7,290,093 | B2 | 10/2007 | Edirisooriya et al. | |
| 7,711,901 | B2 | 5/2010 | Shannon et al. | |
| 8,032,706 | B2 | 10/2011 | Zheltov et al. | |
| 8,112,585 | B2 * | 2/2012 | Patel et al. ................... | 711/118 |
| 8,607,001 | B2 * | 12/2013 | Zhao et al. ................... | 711/134 |
| 2004/0098541 | A1 | 5/2004 | Megiddo et al. | |
| 2004/0221110 | A1 | 11/2004 | Rowlands et al. | |
| 2008/0086600 | A1 | 4/2008 | Qiao | |
| 2008/0172531 | A1 * | 7/2008 | Liu et al. ....................... | 711/135 |
| 2010/0324880 | A1 | 12/2010 | Braun et al. | |
| 2011/0055838 | A1 * | 3/2011 | Moyes .......................... | 718/102 |
| 2011/0238925 | A1 * | 9/2011 | Robinson ..................... | 711/141 |
| 2012/0226871 | A1 | 9/2012 | Cantin et al. | |
| 2013/0054979 | A1 * | 2/2013 | Basmov et al. .............. | 713/193 |

OTHER PUBLICATIONS

Irwin, Mary Jane, Penn State University, Improving Cache Performance, CS.305 Computer Architecture, 2005, pp. 1-22.*
PCT, International Search Report and Written Opinion of the International Searching Authority for PCT Application No. PCT/US2013/044804, (Sep. 4, 2013), Whole Document.

* cited by examiner

*Primary Examiner* — Aimee Li
*Assistant Examiner* — Edmund Kwong
(74) *Attorney, Agent, or Firm* — Blakely, Sokoloff, Taylor & Zafman LLP

(57) ABSTRACT

Techniques and mechanisms for adaptively changing between replacement policies for selecting lines of a cache for eviction. In an embodiment, evaluation logic determines a value of a performance metric which is for writes to a non-volatile memory. Based on the determined value of the performance metric, a parameter value of a replacement policy is determined. In another embodiment, cache replacement logic performs a selection of a line of cache for data eviction, where the selection is in response to the policy unit providing an indication of the determined parameter value.

15 Claims, 7 Drawing Sheets

| $N[l, d]$ | $N[l, c]$ | $N[l, v]$ | Victimization Priority |
|---|---|---|---|
| 0 | 0 | 0 | Invalid (Priority 0) |
| Don't Care | Don't Care | Low (<T_low1) | Low Valid (Priority 1) |
| Low (<T_low2) | Don't Care | Don't Care | Low Dirty (Priority 2) |
| Don't Care | Don't Care | Don't Care | Agnostic (Priority 3) |

FIG. 4A

```
415    if (write_stall_counter > T_adaptive)
420        T_low1 = T_ref1      // Implement dirty/clean aware replacement
425        T_low2 = T_ref2
       else
430        T_low1 = 0           // Implement dirty/clean agnostic replacement
435        T_low2 = 0
```

FIG. 4B

APPARATUS, SYSTEM AND METHOD FOR ADAPTIVE CACHE REPLACEMENT IN A NON-VOLATILE MAIN MEMORY SYSTEM

BACKGROUND

1. Technical Field

This invention relates in general to caches in computer systems and more particularly, but not exclusively, to a method for replacing blocks in the cache.

2. Background Art

Caches provide comparatively close, fast access to important information for processing resources of a computer. For example, caches are often used to store memory blocks that have been accessed recently by a central processing unit (CPU). But it is not practical to make caches large enough to store all of the available memory blocks. Aside from the obvious fact that such a large cache would make the main memory unnecessary, cache memory is more expensive than main memory. To keep costs down, caches tend to be of smaller size relative to main memory.

Because caches cannot store every block in main memory, when a new block needs to be allocated from the cache, the cache must use a replacement policy to decide what block currently in the cache is to be replaced. A good replacement policy is highly valuable for effective cache utilization. A Least Frequently Used (LFU) replacement policy tracks how often each block in the cache has been used and replaces the block that has the lowest frequency of use. A Least Recently Used (LRU) replacement policy tracks how long it has been since each block in the cache has been used and replaces the block that has gone the longest since it was last used. LRU and LFU are two popular cache replacement policies. However, neither LRU nor LFU suits the requirements of all computing applications. As the size and speed of memory systems grow with successive generations of integrated circuit technology, the performance of such memory systems is increasingly sensitive to inefficiencies in cache management.

BRIEF DESCRIPTION OF THE DRAWINGS

The various embodiments of the present invention are illustrated by way of example, and not by way of limitation, in the figures of the accompanying drawings and in which:

FIG. 4A is a table illustrating elements of a set of priorities for providing adaptive cache replacement according to an embodiment.

FIG. 4B is pseudocode illustrating elements of an algorithm for determining a cache replacement parameter according to an embodiment.

DETAILED DESCRIPTION

Certain embodiments variously provide adaptive cache replacement which, for example, takes into account asymmetric read/write performance of non-volatile main memory and adaptively changes between replacement policies based on the current state of the write performance in the non-volatile memory. Certain features of various embodiments are discussed herein with respect to a cache replacement for a sectored cache. A sectored cache may, for example, be characterized by three parameters—line size (L), sector size (S), and way size (W). Line size (L) is the size of a cache line. Sector size (S) is the size of each sector in a cache line, where the number of sectors in a cache line is then L/S. Way size (W) is the number of ways in a set. However, such discussion may be extended to apply to additionally or alternatively apply to any of a variety of other cache types.

Figure 1:
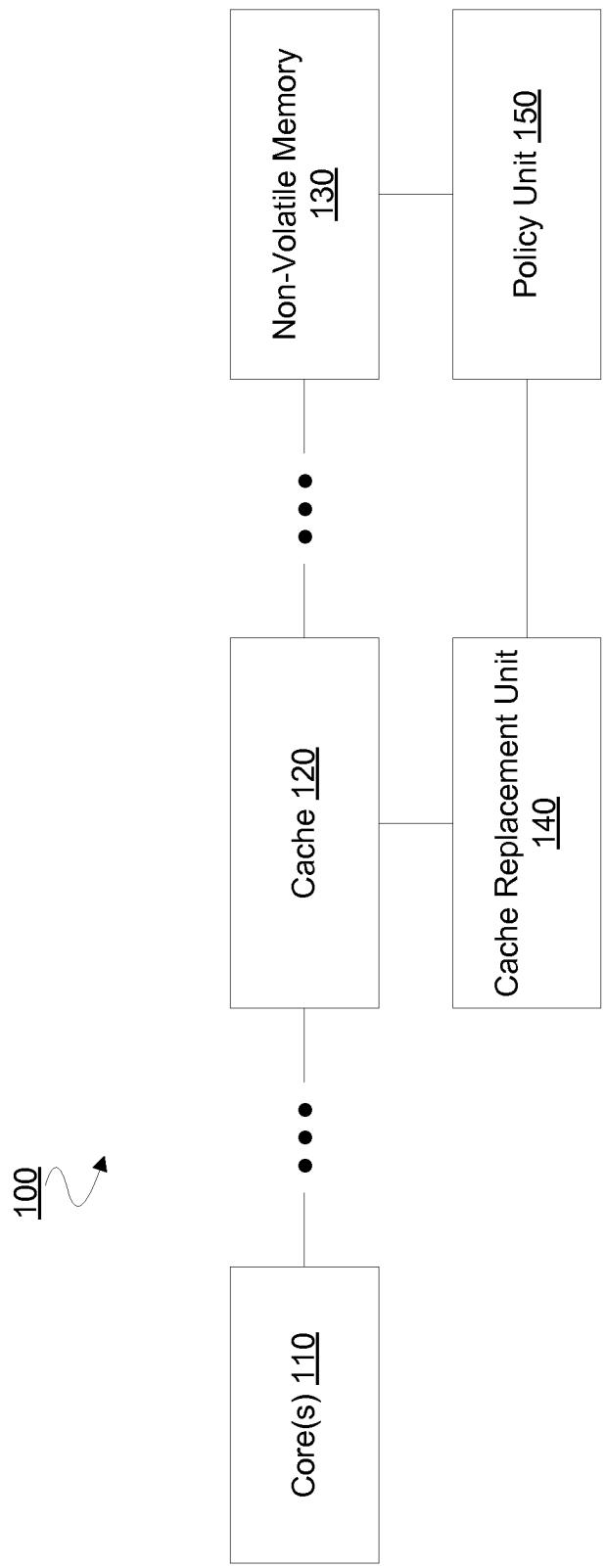
FIG. 1 is a block diagram illustrating elements of a system for providing adaptive cache replacement according to an embodiment.

FIG. 1 shows elements of an illustrative computer system 100 for caching data according to an embodiment. Computer system 100 may, for example, include a hardware platform of a personal computer such as a desktop computer, notebook, ultrabook or other laptop computer, a handheld computer—e.g. a tablet, palmtop, cell phone, media player, and/or the like—and/or other such computer system. Alternatively or in addition, computer system 100 may provide for operation as a server, workstation, or other such computer system. In an embodiment, computer system 100 includes one or more mechanisms to adaptively change between different policies for performing cache replacement operations.

In an embodiment, computer system 100 includes one or more cores 110 of at least one processor of computer system 100, the one or more cores 110 to variously access and/or operate on data stored in computer system 100. Some or all of one or more cores 110 may reside in any of a variety of processors including, but not limited to, a central processing unit (CPU), a graphics processor, a co-processor, a security processor and/or the like. For example, one or more cores 110 may include cores residing on different respective processors of computer system 100, although certain embodiments are not limited in this regard.

Computer system 100 may further include non-volatile memory 130 to store data for access by one or more cores 110. For example, non-volatile memory 130 may comprise random access memory (RAM) including, but not limited to, one or more of flash memory, non-volatile static RAM (nvSRAM), ferroelectric RAM (FRAM), magnetoresistive RAM (MRAM), phase-change memory (PCM), Phase Change Memory with Switch (PCMS) and any of a variety of other such non-volatile memory hardware. Non-volatile memory 130 may operate as some or all of main memory for computer system 100, although certain embodiments are not limited in this regard.

In an embodiment, computer system 100 further includes cache 120—e.g. including volatile cache memory—variously coupled, directly or indirectly, to one or more cores 110 and to non-volatile memory 130. Cache 120 may cache data for access by one or more cores 110—e.g. including caching a version of data which is stored in non-volatile memory 130. In an embodiment, some or all of cache 120 resides within a processing unit—such as a CPU—which includes one or more cores 110. Alternatively or in addition, some or all of cache 120 may be external to such a processing unit. By way of illustration and not limitation, cache 120 may include one or more of an L1 cache, an L2 cache, an L3 cache and/or the like.

Operation of cache 120 may be supported by any of a variety of conventional cache management techniques and/or mechanisms of computer system 100. For example, cache 120 may be one of multiple caches of computer system 100—e.g. where state of such caches is tracked by cache coherency logic of computer system 100. Such cache coherency logic may, for example, track the state of data stored in cache 120. By way of illustration and not limitation, various cached data may, at different times, be classified with one of a plurality of classifications. Such classifications may, for example, include an "Invalid" classification to indicate that a line of cache does not currently store useful data. Alternatively or in addition, such classifications may include a "Clean" classification to indicate that a line of cache stores an up-to-date version of data stored in non-volatile memory 130. Alternatively or in addition, such classifications may include a "Dirty" classification to indicate that a line of cache has been written to, and that corresponding data stored in non-volatile memory 130 is out-of-date. In an embodiment, classification of data may be implicit—e.g. where failure to classify a line of cache as Invalid implicitly classifies the line of cache as Valid, where failure to classify a line of cache as Dirty implicitly classifies the line of cache as Clean, and/or the like. Any of a variety of additional or alternative classifications to track the state of cached data may be used according to different embodiments. The tracking of such states of cache data may be according to conventional techniques, in certain embodiments. To avoid obscuring features of various embodiments, certain conventional cache management techniques and/or mechanisms are not shown in computer system 100.

In an embodiment, computer system 100 further comprises cache replacement unit 140 including logic—e.g. hardware, firmware and/or executing software—to select a line of cache 120 for an eviction. Selection of a line for eviction may be according to a cache replacement policy—e.g. a policy selected from a plurality of cache replacement policies of computer system 100. Cache replacement unit 140 may, for example, include or couple to logic which performs cache replacement according to conventional techniques. In an embodiment, cache replacement unit 140 includes logic to supplement any such conventional cache replacement techniques.

By way of illustration and not limitation, cache replacement unit 140 may include or otherwise has access to logic for variously implementing different cache replacement policies at different times. Such policies may comprise different respective criteria for identifying a block—e.g. a line—of cache as having data which is to be evicted. Eviction of such data may make a line of cache 120 available for caching other data from non-volatile memory 130. In an embodiment, cache replacement unit 140 may, at a given point in time during operation of computer system 100, adaptively change from implementing one cache replacement policy to implementing another cache replacement policy. Such adaptive changing may, for example, be based upon detection of a state of computer system 100. By way of illustration and not limitation, such adaptive policy changing may be based upon one or more performance metrics which describe an operation or operations to access data in cache 120 and/or to access data in non-volatile memory 130.

Computer system 100 may further include policy unit 150 comprising logic—e.g. hardware, firmware and/or executing software—to detect a state of computer system 100 and, based on the identified state, to indicate to cache replacement unit 140 a cache replacement policy to apply for management of cache 120. Policy unit 150 may be incorporated with some or all logic of cache replacement unit 140, although certain embodiments are not limited in this regard. In an embodiment, policy unit 150 performs repeated evaluations to determine current state of computer system 100. Based on such repeated evaluations, policy unit 150 may identify different cache replacement policies in succession. In response to the succession of policies identified by policy unit 150, cache replacement unit 140 may adaptively change from implementing a first cache replacement policy for cache 120 to implementing a second cache replacement policy for cache 120.

Figure 2:
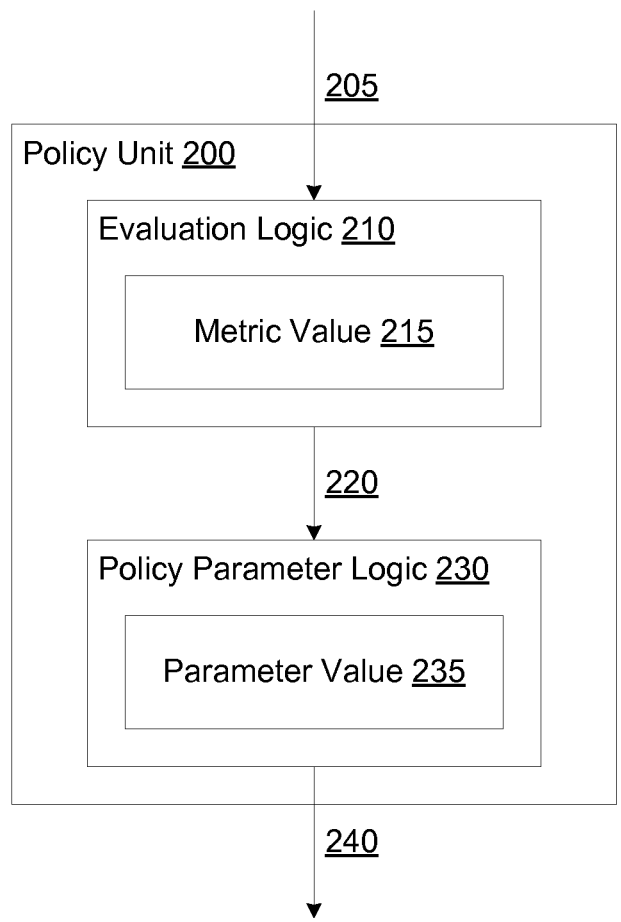
FIG. 2 is a block diagram illustrating elements of a policy unit for determining a parameter of a cache replacement policy according to an embodiment.

FIG. 2 illustrates elements of a policy unit 200, according to an embodiment, for indicating a cache replacement policy for managing a cache. Policy unit 200 may operate in a computer system having some or all of the features of computer system 100, for example. In an embodiment, policy unit 200 provides some or all of the functionality of policy unit 150.

Policy unit 200 may include evaluation logic 210 to determine a value 215 of a performance metric of the computer system. In an embodiment, evaluation logic 210 includes logic—e.g. including hardware, firmware and/or executing software—to detect an indication 205 of a communication exchanged with one or more of a processor core, a cache and a non-volatile memory of the computer system. By way of illustration and not limitation, policy unit 200 may snoop one or more signal lines—e.g. including signal lines of a data bus, address bus, control bus, and/or the like—coupled between non-volatile memory and one or both of a cache memory and a processor core of the computer system. In an embodiment, indication 205 is a dedicated control signal sent from a non-volatile memory device, processor core or cache of the computer system. Certain embodiments are not limited with respect to particular mechanism by which indication 205 is provided to policy unit 200.

Determining value 215 may include evaluation logic 210 evaluating a performance metric which is for—e.g. specific to—writes to non-volatile memory. For example, value 215 may be calculated or otherwise determined based on information describing only operations to write to such non-volatile memory. In an embodiment, value 215 is evaluated independent of any evaluation of an operation to read from such non-volatile memory. The performance metric may, for example, be specific to writes to non-volatile memory by a particular one or more processor cores, although certain embodiments are not limited in this regard.

In an embodiment, value 215 describes an amount of stalling which takes place in operations to write to the non-volatile memory. Such stalling may be caused, for example, due to unavailability of some resource—e.g. a bus, buffer, scheduling logic and/or the like—which is to perform some next operation for servicing a given write command. Any of a variety of conventional mechanisms for detecting such unavailability may be used, and are not limiting on certain embodiments. In an embodiment, metric value 215 describes an amount of time—e.g. a number of clock cycles—during which some write command (or write commands) to the non-volatile memory was stalled. For brevity, such cycles are referred to herein as stalled write cycles.

By way of illustration and not limitation, metric value 215 may include a count write_stall_count of a total number of stalled write cycles within some period of time. The period of time may be based on a predetermined time window parameter T_window. In an illustrative embodiment, evaluation logic 210 may periodically perform an evaluation of the performance metric, where each evaluation is for a respective time period in a sequence of time periods which are each of length T_window. Metric value 215 may, for example, describe a count of a total number of write operations during some period of time which were each stalled above some threshold amount of time—e.g. above some threshold number of clock cycles. Additionally or alternatively, metric value 215 may describe a portion (e.g. fraction, percentage, etc.) of all write operations during some period of time which were each stalled above such a threshold amount of time. Any of a variety of additional or alternative metrics may be used to describe write stalling, according to different embodiments.

Policy unit 200 may further include policy parameter logic 230 to receive from evaluation logic 210 a signal 220 identifying metric value 215. Based on evaluation logic 210 identifying metric value 215, policy parameter logic 230 may determine a parameter value 235 of a cache replacement policy. Based on determined parameter value 235, policy parameter logic 230 may generate a signal 240 indicating the replacement policy to be applied for managing a cache of the computer system. In an embodiment, signal 240 specifies parameter value 235 to a cache replacement unit, where the cache replacement determines a cache replacement policy to implement based on specification of parameter value 235 with signal 240. For example, signal 240 may include all criteria of a cache replacement policy to be implemented by the cache replacement unit.

In an embodiment, the parameter value 235 includes a threshold value for a characteristic of a cache line—e.g. where comparison of the characteristic to the threshold value is a basis for evaluating whether the cache line is a candidate for data eviction. Such a threshold may, for example, be a maximum (or alternatively, minimum) allowable amount of data in a block of cache—e.g. in a cache line—which has a particular classification. By way of illustration and not limitation, such a threshold may be a minimum number of sectors in a cache line which are classified as Dirty. Correspondingly, such a threshold may be a maximum number of sectors in a cache line which are classified as Clean. Such a threshold may additionally or alternatively include a maximum (or minimum) amount of data of some other classification—e.g. Valid—according to different embodiments.

Policy parameter logic 230 may include data and/or logic for identifying respective parameters of different cache replacement policies. Such multiple policies may, for example, include a first policy to select a cache line for eviction based at least in part on an amount of data of the cache line which is of a particular classification—e.g. one of Dirty, Clean, Valid and/or the like. To demonstrate features of certain embodiments, such a policy is discussed in the context of a "dirtiness-aware" policy. A cache replacement policy which is dirtiness-aware, as referred to herein, is one which evaluates whether a cache line is to be replaced based on whether some data stored in the line is Dirty. For example, the policy may determine whether an amount of Dirty data in the line is above a threshold amount of data. A dirtiness-aware replacement policy may alternatively be considered, and referred to, as a "cleanliness-aware" replacement policy, at least insofar as determining whether data of a cache line is Dirty is also determinative of whether such data is Clean. Any of a variety of additional or alternative classifications of data may be used as a basis to select a cache line for eviction according to a given replacement policy.

The multiple policies which policy parameter logic 230 variously indicates may additionally or alternatively include a second policy to select a cache line for eviction independent of a particular classification (or any classification) of data in that cache line. For example, such a second policy may perform an evaluation which is independent of whether the data is Dirty. For brevity, such a policy is referred to herein as a dirtiness-agnostic replacement policy. A dirtiness-agnostic replacement policy may be alternatively considered, and referred to as, a cleanliness-agnostic replacement policy. A dirtiness-agnostic (cleanliness-agnostic) policy may, for example, include a LRU, LFU or random cache replacement policy.

Figure 3:
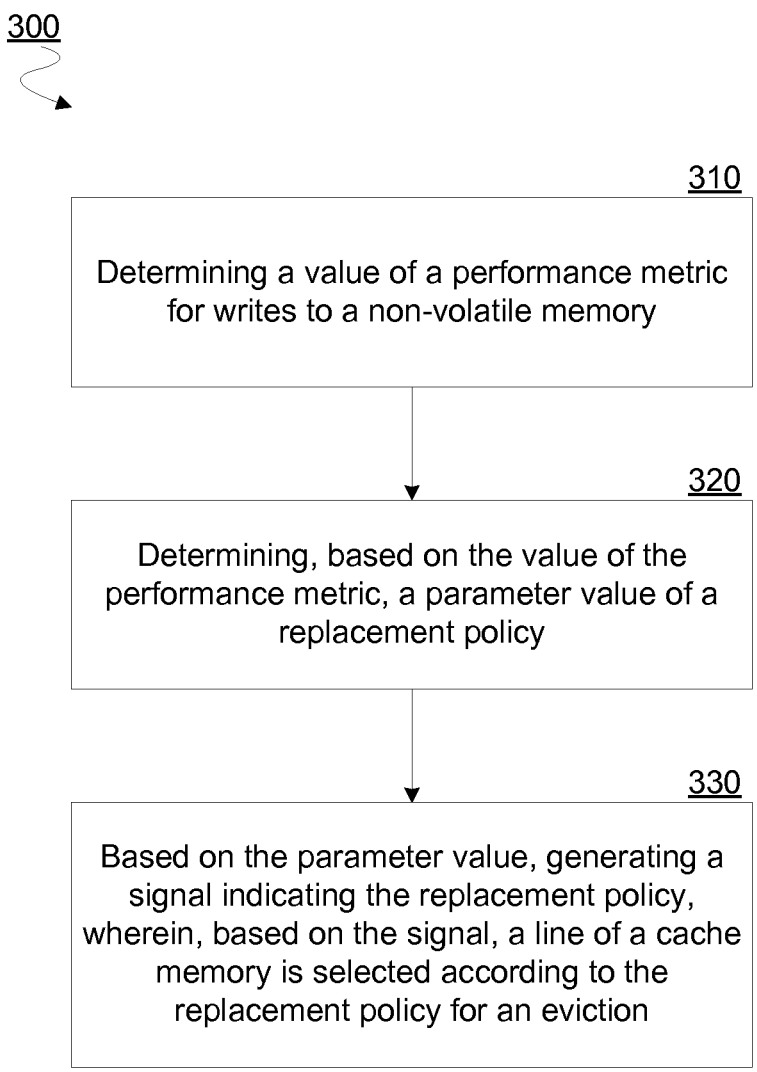
FIG. 3 is a flow diagram illustrating elements of a method for determining a cache replacement policy according to an embodiment.

FIG. 3 illustrates elements of a method 300 for determining a cache replacement policy according to an embodiment. Method 300 may determine a cache replacement policy for a system having some or all of the features of computer system 100. In an embodiment, method 300 is performed with logic including some or all of the functionality of policy unit 200.

Method 300 may include, at 310, determining a value of a performance metric for writes to a non-volatile memory. In an embodiment, the non-volatile memory and a cache memory are each to store respective data for access by one or more processors of a computer system. The performance metric may describe stalling of write accesses to the non-volatile memory, for example. In an embodiment, the performance metric value is determined at 310 based on successive comparisons of write completion times each to a threshold time period, where the write completion times are of different respective write instances to access the non-volatile memory.

By way of illustration and not limitation, the value determined at 310 may be a number of write accesses which are identified as stalled. For example, the value determined at 310 may be a total number of stalled write accesses which take place within a period of time having a length equal to a time window parameter value. Alternatively or in addition, the value determined at 310 may describe a percentage, or other fraction, of some set of access instances which are stalled write instances.

Method 300 may further include, at 320, determining, based on the value determined at 310, a parameter value of a replacement policy. The determining of the parameter value at 320 may, for example, include comparing a number of stalled write accesses to a threshold number of accesses. In an embodiment, the parameter value determined at 320 is a threshold value for classifying a line of the cache memory as satisfying a given priority of a replacement policy. In an embodiment, the parameter value is determined at 320 independent of any value of a performance metric for a read access to the non-volatile memory.

Method 300 may further include, at 330, generating a signal based on the parameter value determined at 320, the signal indicating a replacement policy. In an embodiment, based on the signal generated at 330, a line of cache memory is selected for an eviction according to the indicated replacement policy.

Certain embodiments variously adapt different cache replacement policies at different times to dynamically accommodate variance in an ability to keep Dirty data in cache longer—e.g. to reduce write-traffic to non-volatile (e.g. main) memory. For example, let N[l, d] and N[l, c] denote the number of Dirty sectors and Clean sectors, respectively, for any given cache line l. Then N[l, v]=N[l, d]+N[l, c] may denote the number of valid sectors of that cache line. Based on the respective values of N[l, d], N[l, c] and N[l, v] for each cache line l, a cache may be evaluated to identify a cache line as a candidate for eviction.

Figure 4C:
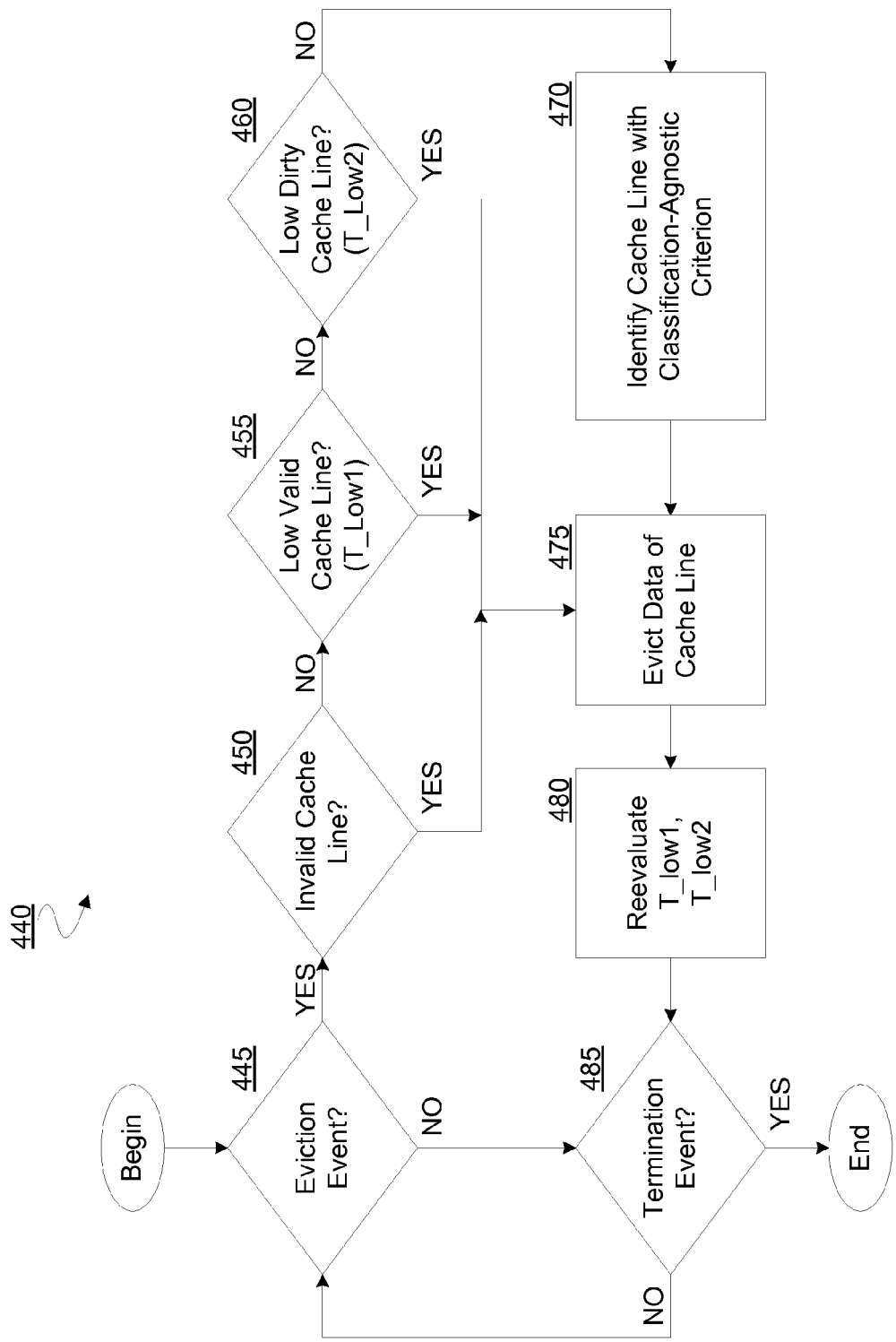
FIG. 4C is flow diagram illustrating elements of a method for evicting cached data according to an embodiment.

In an illustrative embodiment, cache replacement logic such as that of cache replacement unit 140 may evaluate a cache to identify a cache line for eviction, where the evaluation based on priority list 400 of FIG. 4A. FIG. 4C illustrates elements of an algorithm 440 for successively repeating evaluations according to one embodiment, where one or more parameters of the evaluations are dynamically reevaluated based on a current value of a performance metric. For example, such cache replacement logic may perform successive evaluations each based on a respective victimization priority—e.g. based on a respective one of the victimization priorities of priority list 400.

By way of illustration and not limitation, cache replacement logic may perform a first evaluation based on Priority 0 of priority list 400, the first evaluation to search for any invalid cache line. Invalidity of a cache line l may be indicated, for example, if N[l, v], N[l, d] and N[l, c] are all zero. Where the first evaluation fails to identify any invalid cache line, the cache replacement logic may, in an embodiment, perform a second evaluation based on Priority 1 of priority list 400, the second evaluation to identify for eviction any cache line which is considered to have a low amount of Valid data. In an embodiment, low validity of a cache line l may be indicated by a relation of N[l, v] to a threshold parameter T_low1—e.g. in response to detecting that N[l, v] is less than (in another embodiment, less than or equal to) T_low1.

Where the second evaluation fails to identify any Low Valid cache line, the cache replacement logic may, in an embodiment, perform a third evaluation based on Priority 2 of priority list 400, the third evaluation to identify for eviction any cache line which is considered to have a low amount of Dirty data. In an embodiment, low dirtiness of a cache line l may be indicated by a relation of N[l, d] to a threshold parameter T_low2—e.g. in response to detecting that N[l, d] is less than (in another embodiment, less than or equal to) T_low2. In an embodiment, T_low1 and T_low2 are the same threshold parameter.

Where the third evaluation fails to identify any Low Dirty cache line, the cache replacement logic may, in an embodiment, perform a fourth evaluation based on Priority 3 of priority list 400. The fourth evaluation may, in an embodiment, be agnostic of one or more classifications of data stored in cache lines of the cache. By way of illustration and not limitation, the fourth evaluation may determine whether a cache line is a candidate for eviction independent of whether data in that cache line is of a particular classification or set of classifications (e.g. one or more of Valid, Dirty, Clean and/or the like). The fourth evaluation may be a LRU cache replacement priority, a LFU cache replacement priority or any of a variety of other such dirtiness-agnostic (or other data-classification-agnostic) policies, according to different embodiments.

FIG. 4C illustrates elements of a method 440 according to various embodiments for adaptively changing from managing a cache according to one cache replacement policy to managing the cache according to another cache replacement policy. Method 440 may be performed by circuit logic including some or all of the features of cache replacement unit 140 and policy unit 150, for example.

Method 440 may include detecting, at 445, for some eviction event which indicates that at least one cache line is to be selected for eviction—e.g. where data of the selected cache line is to be replaced with other data from non-volatile memory. The detecting at 445 may, for example, be based on expiration of a period of time, detection of a cache access, a non-volatile memory access and/or according to any of a variety of conventional techniques for identifying a need to select a cache line for eviction.

Method 440 may further include any of a variety of loop sequences to repeatedly perform the detecting at 445 until an eviction event is indicated. By way of illustration and not limitation, if no eviction event is detected at 445, method 440 may perform a test, at 485, to detect for any termination event—e.g. system power down—indicating that further cache replacement processing is not needed. If no termination event is detected at 485, method 440 may repeat the determining at 445.

In an embodiment, detecting an eviction event at 445 may begin a sequence of evaluations to identify a cache line to be subject to data eviction. Such a sequence of evaluations may include one or more of a sequence of evaluations of the cache—e.g. where each evaluation of the sequence is according to a different respective policy criteria. An evaluation sequence may be performed at least once while threshold parameter T_low1 is set at some first value and/or while threshold parameter T_low2 is set at some second value. In an alternate embodiment, T_low1 and T_low2 are the same threshold parameter.

By way of illustration and not limitation, the sequence of evaluations of method 440 may include, at 450, the first evaluation for identifying an Invalid line (Priority 0) of priority list 400. If the evaluation at 450 does not identify an invalid cache line, then method 400 may perform, at 455, the second evaluation for identifying a Low Valid line (Priority 1 of priority list 400). If the evaluation at 455 does not identify a Low Valid cache line based on a current value of T_Low1, then method 400 may perform, at 460, the third evaluation for identifying a Low Dirty line (Priority 2 of priority list 400). If the evaluation at 460 does not identify a Low Dirty cache line based on a current value of T_Low2, then method 400 may perform, at 470, the fourth evaluation for Priority 3 of priority list 400—e.g. to identify a LRU line of the cache. In an embodiment, if any of operations 450, 455, 460 identifies a cache line, or alternatively, after operation 470 identifies a cache line, then method 400 may, at 475, evict data from the identified cache line. Method 400 may include any of a variety of one or more additional or alternative evaluations to variously identify a cache line for eviction, according to various embodiments.

In an embodiment, method 400 further includes techniques to adaptively change a cache replacement policy from one performance of the sequence of evaluations to a next performance of the sequence of evaluations. By way of illustration and not limitation, method 400 may, at 480, reevaluate one or both of thresholds T_low1, T_low2. Pseudocode 410 of FIG. 4B illustrates elements of a technique for reevaluation of thresholds T_low1, T_low2 according to one embodiment. As shown in line 415 of pseudocode 410, a test may be performed—e.g. by evaluation logic 210—of whether the count write_stall_count is greater than (or alternatively, greater than or equal to) some threshold value T_adaptive. The test condition at 415 may indicate whether accesses to non-volatile memory are resulting in overuse of one or more system resources.

If such overuse is indicated by the testing of line 415, then, at line 420, T_low1 may be set to some positive reference value T_ref1 and/or, at line 425, T_low2 may be set to some positive reference value T_ref2. The particular value of T_ref1 and/or of T_ref2 may be implementation specific, and is not limiting on certain embodiment. In an embodiment, setting T_low1 to T_ref1 and/or setting T_low2 to T_ref2 results in the evaluation sequence of method 400 implementing a dirtiness-aware (cleanliness-aware) cache replacement policy. By contrast, if resource overuse is not indicated by the testing of line 415, then, at line 430, T_low1 may be set to zero and/or, at line 435, T_low2 may be set to zero. In an embodiment, setting T_low1 and T_low2 to zero results in the evaluation sequence of method 400 implementing a different cache replacement policy which is, in a sense, dirtiness-agnostic (cleanliness-agnostic). For example, while T_low1 is set to zero, the evaluation at 455 may never select any cache line as a Low Valid candidate for eviction. Alternatively or in addition, while T_low2 is set to zero, the evaluation at 460 may never select any cache line as a Low Dirty candidate for eviction. Accordingly, while T_low1 and T_low2 are both set to zero, the evaluation sequence of method 440 will only select a cache line for eviction with operation 470—e.g. the dirtiness-agnostic (or other data-classification-agnostic) evaluation for Priority 3 of priority list 400.

In an embodiment, reevaluation of T_low1 and/or T_low2 at 480 includes some or all of the features of pseudocode 410. After such reevaluation, method 440 may begin another performance of the evaluation sequence—e.g. in response to operation 485 determining that no termination event is indicated and operation 445 detecting that another cache line is to be selected for eviction.

Figure 5:
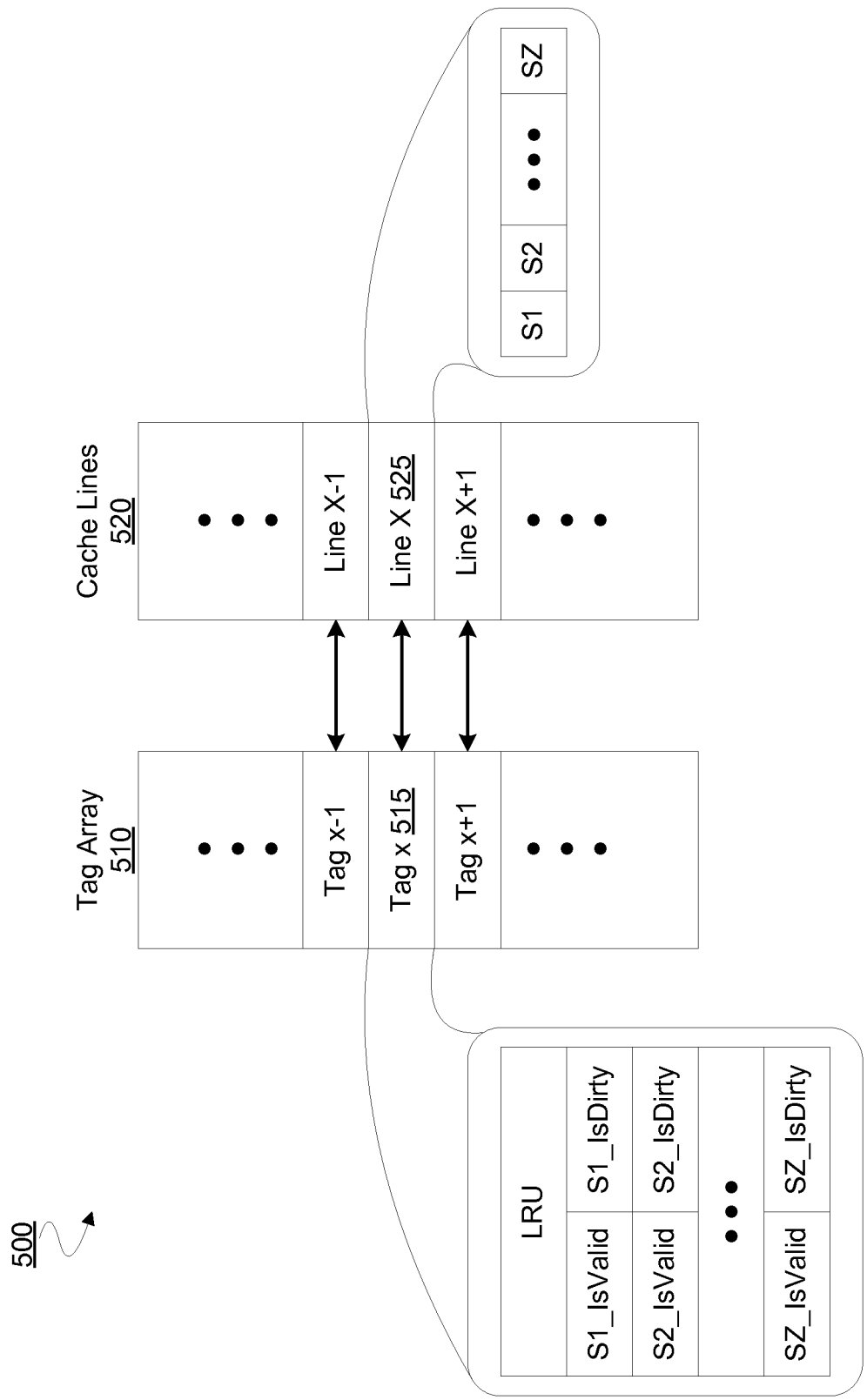
FIG. 5 is a block diagram illustrating elements of a cache system subject to cache replacement according to an embodiment.

FIG. 5 illustrates elements of a cache system 500 including information to implement cache replacement according to an embodiment. Cache system 500 may be a component of a system having some or all of the features of computer system 100, for example. In an embodiment, cache system 500 is managed based on some or all of the techniques of method 300.

Cache system 500 may include cache lines 520—e.g. including illustrative Line X 525—which variously cache respective versions of data stored in non-volatile memory (not shown). Cache lines 520 may each include one or more sectors—e.g. where Line X 525 comprises illustrative sectors S1, S2, . . . , SZ.

At a given time during operation of cache system 500, respective data in sectors S1, S2, . . . , SZ may be in various states which, for example, are tracked for cache coherency, cache replacement and/or any of a variety of other cache management techniques. To facilitate such cache management, cache system 500 may further include a tag array 510 including tags which each correspond to a different respective one of cache lines 520. By way of illustration and not limitation, tag array 510 may include tag x 515 corresponding to Line 525 of cache lines 520. In an embodiment, tag x 515 stores a value LRU specifying whether Line 525 is a least recently used one of cache lines 520. Alternatively or in addition, tag x 515 may store one or more status values each specific to a respective one of sectors S1, S2, . . . , SZ.

By way of illustration and not limitation, tag x 515 may store for sector S1 values S1_IsValid and S1_IsDirty specifying, respectively, whether the data of sector S1 is valid and whether the data of sector S1 is dirty. Tag x 515 may similarly store corresponding values S2_IsValid, S2_IsDirty for sector S2, values SX_IsValid, SZ_IsDirty for sector SZ and/or any of a variety of additional or alternative sector specific state information. In an embodiment, some of the information of tag x 515 is stored and/or maintained according to conventional cache coherency and/or other cache management techniques.

A cache replacement policy may, in an embodiment, include evaluating some or all of cache lines 520 based on information in tag array 510. For example, cache replacement unit 140 may, in response to identification of a cache replacement policy by policy unit 150, perform one or more evaluations of cache lines 520 each according to a respective cache replacement criterion. By way of illustration and not limitation, such evaluation may include calculating, based on a count of S1_IsValid, S2_IsValid, . . . , SZ_IsValid, a total amount of data in Line 525 which is classified as Valid. Alternatively or in addition, such evaluation may include calculating, based on a count of S1_IsDirty, S2_IsDirty, . . . , SZ_IsDirty, a total amount of data in Line 525 which is classified as Dirty. Based on one or more such calculations, cache replacement unit 140 (or other such logic) may determine whether Line X 525 satisfies a criterion of a cache replacement policy. For example, such counts may be compared to a threshold value such as one T_low1 and T_low2.

Figure 6:
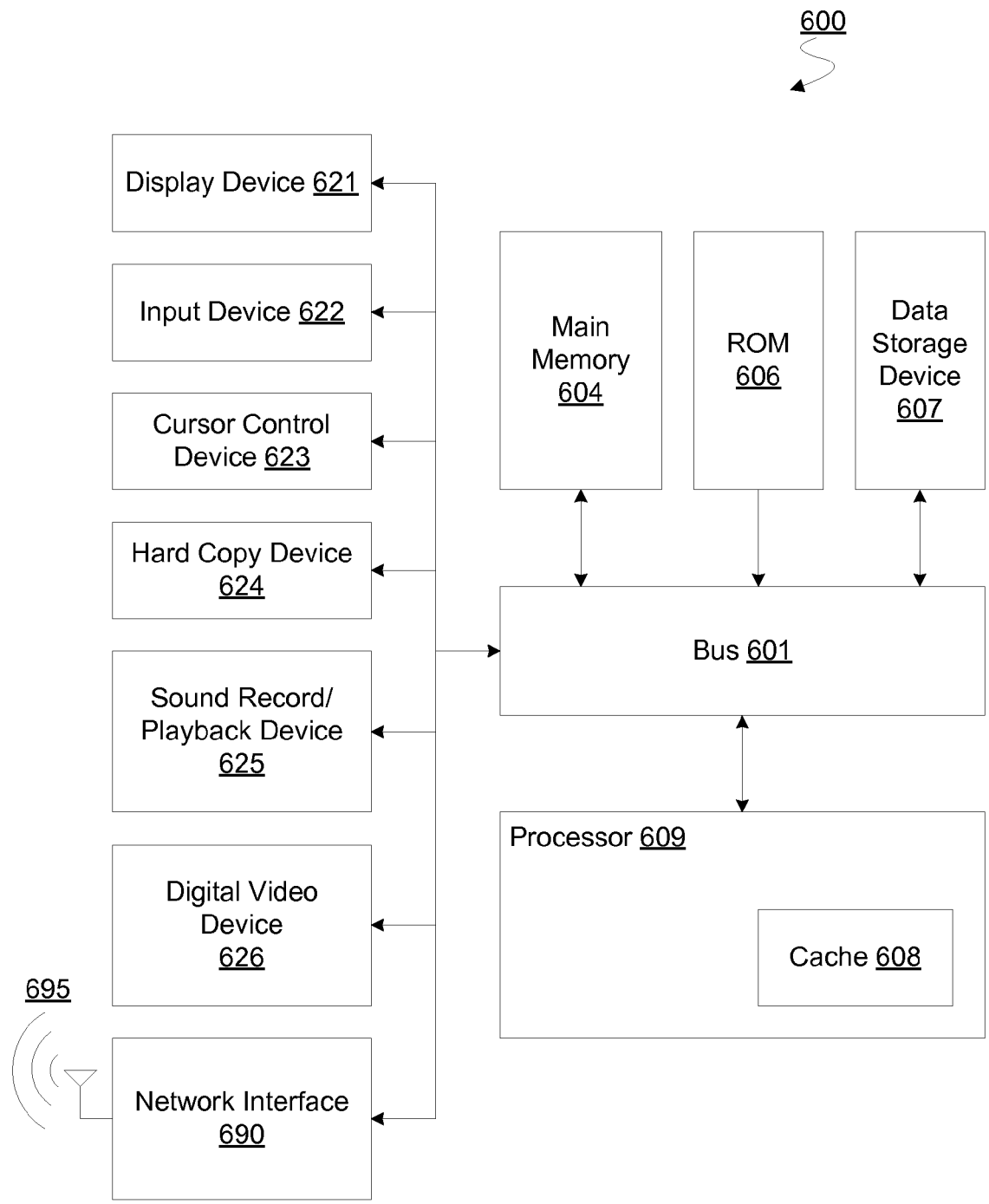
FIG. 6 is a block diagram illustrating elements of a computer platform for providing cache replacement according to an embodiment.

FIG. 6 shows elements of an illustrative computer platform 600 for determining cache replacement according to one embodiment. Computer platform 600 may, for example, include a hardware platform of a computer such as a server, workstation, desktop computer, laptop computer, a handheld computer—e.g. a tablet, palmtop, cell phone, media player, and/or the like—and/or other such computer system. Alternatively, embodiments may be implemented in one or more embedded applications where, for example, an embedded processor is to implement operations to adaptively implement different cache replacement policies each to select a cache line for eviction. Such adaptive cache replacement may be applied to a cache 608 of processor 609 and/or any other cache of computer platform 600.

In an embodiment, computer platform 600 includes at least one interconnect, represented by an illustrative bus 601, for communicating information and a processor 609—e.g. a central processing unit—for processing such information. Processor 609 may include functionality of a complex instruction set computer (CISC) type architecture, a reduced instruction set computer (RISC) type architecture and/or any of a variety of processor architecture types. Processor 609 may couple with one or more other components of computer platform 600 via bus 601. By way of illustration and not limitation, computer platform 600 may include a random access memory (RAM) or other dynamic storage device, represented by an illustrative non-volatile main memory 604 coupled to bus 601, to store information and/or instructions to be executed by processor 609. Main memory 604 also may be used for storing temporary variables or other intermediate information during execution of instructions by processor 609. Computer platform 600 may additionally or alternatively include a read only memory (ROM) 606, and/or other static storage device—e.g. where ROM 606 is coupled to processor 609 via bus 601—to store static information and/or instructions for processor 609.

In an embodiment, computer platform 600 additionally or alternatively includes a data storage device 607 (e.g., a magnetic disk, optical disk, and/or other machine readable media) coupled to processor 609—e.g. via bus 601. Data storage device 607 may, for example, include instructions or other information to be operated on and/or otherwise accessed by processor 609. In an embodiment, processor 609 may perform cache replacement policy evaluations based on accesses—e.g. stalled write accesses—to main memory 604.

Computer platform 600 may additionally or alternatively include a display device 621 for displaying information to a computer user. Display device 621 may, for example, include a frame buffer, a specialized graphics rendering device, a cathode ray tube (CRT), a flat panel display and/or the like. Additionally or alternatively, computer platform 600 may include an input device 622—e.g. including alphanumeric and/or other keys to receive user input. Additionally or alternatively, computer platform 600 may include a cursor control device 623, such as a mouse, a trackball, a pen, a touch screen, or cursor direction keys to communicate position, selection or other cursor information to processor 609, and/or to control cursor movement—e.g. on display device 621.

Computer platform 600 may additionally or alternatively have a hard copy device 624 such as a printer to print instructions, data, or other information on a medium such as paper, film, or similar types of media. Additionally or alternatively, computer platform 600 may include a sound record/playback device 625 such as a microphone or speaker to receive and/or output audio information. Computer platform 600 may additionally or alternatively include a digital video device 626 such as a still or motion camera to digitize an image.

In an embodiment, computer platform 600 includes or couples to a network interface 690 for connecting computer platform 600 to one or more networks (not shown)—e.g. via one or more antennae 695. Such one or more networks may, for example, include a dedicated storage area network (SAN), a local area network (LAN), a wide area network (WAN), a virtual LAN (VLAN), an Internet and/or any of a variety of other types of networks. By way of illustration and not limitation, network interface 690 may include one or more of a network interface card (NIC), an antenna such as a dipole antenna, or a wireless transceiver, although the scope of the present invention is not limited in this respect.

In one aspect, an apparatus comprises a policy unit including evaluation logic to determine a value of a performance metric for writes to a non-volatile memory, wherein the non-volatile memory and a cache memory are each to store respective data for access by the one or more processors. The policy unit further comprises policy parameter logic to determine, based on the value of the performance metric, a parameter value of a replacement policy. The policy unit is to generate, based on the parameter value, a signal indicating the replacement policy, wherein a cache replacement unit selects a line of the cache memory for an eviction, wherein the line is selected according to the replacement policy based on the signal.

In an embodiment, the metric describes stalling of writes to the non-volatile memory. In an embodiment, the metric is a number of stalled write accesses. In an embodiment, the metric is a number of stalled write accesses within a period of time having a length equal to a time window parameter value. In an embodiment, the policy parameter logic to determine the parameter value includes the policy parameter logic to compare a number of accesses to a threshold number of accesses. In an embodiment, the parameter value is a threshold value for prioritizing a line of the cache memory. In an embodiment, the parameter is a threshold value for a number of dirty sectors or a number of valid sectors. In an embodiment, the policy parameter logic is to generate the signal for a transition from a dirtiness aware replacement policy and a least recently used replacement policy.

In another aspect, a method comprises determining a value of a performance metric for writes to a non-volatile memory, wherein the non-volatile memory and a cache memory are each to store respective data for access by one or more processors. The method further comprises determining, based on the value of the performance metric, a parameter value of a replacement policy, and based on the parameter value, generating a signal indicating the replacement policy, wherein, based on the signal, a line of the cache memory is selected according to the replacement policy for an eviction.

In an embodiment, the metric describes stalling of writes to the non-volatile memory. In an embodiment, the metric is a number of stalled write accesses. In an embodiment, the metric is a number of stalled write accesses within a period of time having a length equal to a time window parameter value. In an embodiment, determining the parameter value includes comparing a number of accesses to a threshold number of accesses. In an embodiment, the parameter value is a threshold value for prioritizing a line of the cache memory. In an embodiment, the parameter is a threshold value for a number of dirty sectors or a number of valid sectors. In an embodiment, the signal is generated for a transition from a dirtiness aware replacement policy and a least recently used replacement policy.

In another aspect, a computer system comprises one or more processor cores, a cache memory and a non-volatile memory each to store respective data for access by the one or more processors. The computer system further comprises a policy unit including evaluation logic to determine a value of a performance metric for writes to the non-volatile memory, and policy parameter logic to determine, based on the value of the performance metric, a parameter value of a replacement policy. The policy unit is to generate, based on the parameter value, a signal indicating the replacement policy. The computer system further comprises a cache replacement unit coupled to the policy unit, the cache replacement unit to select a line of the cache memory for an eviction, wherein the line is selected according to the replacement policy based on the signal.

In an embodiment, the metric describes stalling of writes to the non-volatile memory. In an embodiment, the metric is a number of stalled write accesses. In an embodiment, the metric is a number of stalled write accesses within a period of time having a length equal to a time window parameter value. In an embodiment, the policy parameter logic to determine the parameter value includes the policy parameter logic to compare a number of accesses to a threshold number of accesses. In an embodiment, the parameter value is a threshold value for prioritizing a line of the cache memory. In an embodiment, the parameter is a threshold value for a number of dirty sectors or a number of valid sectors. In an embodiment, the policy parameter logic to generate the signal for a transition from a dirtiness aware replacement policy and a least recently used replacement policy.

In another aspect, a computer-readable storage medium has stored thereon instructions which, when executed by one or more processing units, cause the one or more processing units to perform a method. The method comprises determining a value of a performance metric for writes to a non-volatile memory, wherein the non-volatile memory and a cache memory are each to store respective data for access by one or more processors. The method further comprises determining, based on the value of the performance metric, a parameter value of a replacement policy, and based on the parameter value, generating a signal indicating the replacement policy, wherein, based on the signal, a line of the cache memory is selected according to the replacement policy for an eviction.

In an embodiment, the metric describes stalling of writes to the non-volatile memory. In an embodiment, the metric is a number of stalled write accesses. In an embodiment, the metric is a number of stalled write accesses within a period of time having a length equal to a time window parameter value. In an embodiment, determining the parameter value includes comparing a number of accesses to a threshold number of accesses. In an embodiment, the parameter value is a threshold value for prioritizing a line of the cache memory.

Techniques and architectures for operating a cache memory are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
    a policy unit including:
        evaluation logic comprising circuitry configured to determine a value of a performance metric based on writes to a non-volatile memory during an enforcement of a replacement policy, wherein the non-volatile memory and a cache memory are each to store respective data for access by one or more processors, the replacement policy defining a sequence of evaluations each to detect for a cache line to be evicted; and
        policy parameter logic comprising circuitry configured to perform a comparison of the value of the performance metric to a reference value specifying for the replacement policy a predetermined threshold number of stalled accesses, the policy parameter logic to update the replacement policy based on the comparison, including the policy parameter logic to update, for each of multiple evaluations of the sequence, a respective parameter value of the evaluation indicating a threshold number of dirty sectors or a threshold number of valid sectors, the policy unit further to generate a signal indicating an update to the replacement policy, wherein a cache replacement unit selects a line of the cache memory for an eviction, wherein the line is selected according to the replacement policy based on the signal.

2. The apparatus of claim 1, wherein the performance metric is a number of stalled write accesses within a period of time having a length equal to a time window parameter value.

3. The apparatus of claim 1, wherein the respective parameter value of one of the multiple evaluations is a threshold value for prioritizing a line of the cache memory.

4. The apparatus of claim 1, wherein the policy parameter logic to generate the signal for a transition from a dirtiness aware replacement policy and a least recently used replacement policy.

5. A method comprising:
    determining a value of a performance metric based on writes to a non-volatile memory during an enforcement of a replacement policy, wherein the non-volatile memory and a cache memory are each to store respective data for access by one or more processors, the replacement policy defining a sequence of evaluations each to detect for a cache line to be evicted;
    performing a comparison of the value of the performance metric to a reference value specifying for the replacement policy a predetermined threshold number of stalled accesses;
    updating the replacement policy based on the comparison, including updating, for each of multiple evaluations of the sequence, a respective parameter value of the evaluation indicating a threshold number of dirty sectors or a threshold number of valid sectors; and
    generating a signal indicating an update to the replacement policy, wherein, based on the signal, a line of the cache memory is selected according to the replacement policy for an eviction.

6. The method of claim 5, wherein the performance metric is a number of stalled write accesses within a period of time having a length equal to a time window parameter value.

7. The method of claim 5, wherein the respective parameter value of one of the multiple evaluations is a threshold value for prioritizing a line of the cache memory.

8. The method of claim 5, wherein the signal is generated for a transition from a dirtiness aware replacement policy and a least recently used replacement policy.

9. A computer system comprising:
one or more processor cores;
a cache memory and a non-volatile memory each to store respective data for access by the one or more processors;
a policy unit including:
evaluation logic comprising circuitry configured to determine a value of a performance metric based on writes to the non-volatile memory during an enforcement of a replacement policy defining a sequence of evaluations each to detect for a cache line to be evicted; and
policy parameter logic comprising circuitry configured to perform a comparison of the value of the performance metric to a reference value specifying for the replacement policy a predetermined threshold number of stalled accesses, the policy parameter logic to update the replacement policy based on the comparison, including the policy parameter logic to update, for each of multiple evaluations of the sequence, a respective parameter value of the evaluation indicating a threshold number of dirty sectors or a threshold number of valid sectors, the policy unit further to generate a signal indicating an update to the replacement policy; and
a cache replacement unit coupled to the policy unit, the cache replacement unit to select a line of the cache memory for an eviction, wherein the line is selected according to the replacement policy based on the signal.

10. The computer system of claim 9, wherein the performance metric is a number of stalled write accesses within a period of time having a length equal to a time window parameter value.

11. The computer system of claim 9, wherein the respective parameter value of one of the multiple evaluations is a threshold value for prioritizing a line of the cache memory.

12. The computer system of claim 9, wherein the policy parameter logic to generate the signal for a transition from a dirtiness aware replacement policy and a least recently used replacement policy.

13. A non-transitory computer-readable storage medium having stored thereon instructions which, when executed by one or more processing units, cause the one or more processing units to perform a method comprising:
determining a value of a performance metric based on writes to a non-volatile memory during an enforcement of a replacement policy, wherein the non-volatile memory and a cache memory are each to store respective data for access by one or more processors, the replacement policy defining a sequence of evaluations each to detect for a cache line to be evicted;
performing a comparison of the value of the performance metric to a reference value specifying for the replacement policy a predetermined threshold number of stalled accesses;
updating the replacement policy based on the comparison, including updating, for each of multiple evaluations of the sequence, a respective parameter value of the evaluation indicating a threshold number of dirty sectors or a threshold number of valid sectors; and
generating a signal indicating an update to the replacement policy, wherein, based on the signal, a line of the cache memory is selected according to the replacement policy for an eviction.

14. The computer-readable storage medium of claim 13, wherein the performance metric is a number of stalled write accesses within a period of time having a length equal to a time window parameter value.

15. The computer-readable storage medium of claim 13, wherein the respective parameter value of one of the multiple evaluations is a threshold value for prioritizing a line of the cache memory.

* * * * *